United States Patent [19]
Kosaka et al.

[11] Patent Number: 5,369,728
[45] Date of Patent: Nov. 29, 1994

[54] METHOD AND APPARATUS FOR DETECTING WORDS IN INPUT SPEECH DATA

[75] Inventors: Tetsuo Kosaka, Ohazahigashi-Koazafurumori; Atsushi Sakurai, Yokohama; Junichi Tamura, Tokyo; Hiroshi Matsuo, Akita, all of Japan

[73] Assignee: Canon Kabushiki Kaisha, Tokyo, Japan

[21] Appl. No.: 895,813

[22] Filed: Jun. 9, 1992

[30] Foreign Application Priority Data

Jun. 11, 1991 [JP] Japan ................. 3-139091

[51] Int. Cl.⁵ ............................... G10L 9/00
[52] U.S. Cl. ........................ 395/2.63; 395/2.73; 395/2.42
[58] Field of Search ................. 381/41–46, 381/51; 395/2, 2.4–2.49, 2.6–2.64, 2.67, 2.73–2.77

[56] References Cited

U.S. PATENT DOCUMENTS

| | | | |
|---|---|---|---|
| 4,481,593 | 11/1984 | Bahler | 395/2 |
| 4,489,435 | 12/1984 | Moshier | 395/2 |
| 4,596,032 | 6/1986 | Sakurai | 381/51 |
| 4,627,091 | 12/1986 | Fedele | 381/46 |
| 4,712,243 | 12/1987 | Ninomiya et al. | 381/43 |
| 4,718,095 | 1/1988 | Asakawa et al. | 381/43 |
| 4,736,429 | 4/1988 | Niyada et al. | 381/43 |
| 4,783,807 | 11/1988 | Marley | 395/2 |
| 4,802,226 | 1/1989 | Watanabe | 381/43 |
| 4,811,399 | 3/1989 | Landell et al. | 381/43 |
| 4,817,159 | 3/1989 | Hoshimi et al. | 381/43 |
| 4,821,325 | 4/1989 | Martin et al. | 381/46 |
| 4,856,067 | 8/1989 | Yamada et al. | 381/45 |

OTHER PUBLICATIONS

"Isolated Words Recognition Using DP Matching and Mahalanobis Distance", Journal of Electro-Communication, vol. J66-A, No. 1, T. Takara et al. (Jan. 1983), pp. 64–70.

"Detection of Segment Type Features for Continuous Speech Recognition", The Acoustical Society of Japan, Transaction No. S 585-53, T. Kosaka et al. (Dec. 19, 1985) pp. 405–412.

"A Connected Spoken Recognition Method by O(n) Dynamic Programming", ICASSP '83, vol. 1, I Nakagawa (Apr. 1983), pp. 296–299.

"Dynamic Time Warping and Vector Quantization in Isolated and Connected Word Recognition", European Conference on Speech Technology, vol. 2, A. Boyer et al. (Sep. 1987), pp. 436–439.

"Consonant Recognition Methods For Unspecified Speakers Using BPF Powers and Time Sequence of LPC Cepstrum Coefficients", Systems and Computers in Japan, vol. 18, No. 6, K. Niyada et al. (Jun. 1987), pp. 47–59.

"Automatic Organization of Word Spotting Reference Patterns", Review of the Electrical Communications Laboratories, vol. 35, No. 6, T. Kawabata et al. (Nov. 1987), pp. 681–686.

*Primary Examiner*—Allen R. MacDonald
*Assistant Examiner*—Michelle Doerrler
*Attorney, Agent, or Firm*—Fitzpatrick, Cella, Harper & Scinto

[57] ABSTRACT

An apparatus and method for recognizing speech includes a memory for storing data representing a reference pattern composed of the combination of a word reference pattern and a silence pattern, and a calculator for calculating the differences between data representing the reference pattern and data representing input speech. The use of such a silence pattern in the reference pattern permits a word such as "other" to be distinguished from the word "mother".

20 Claims, 9 Drawing Sheets

EXPLANATORY VIEW OF
DETECTION OF MINIMUM POINT

METHOD AND APPARATUS FOR DETECTING WORDS IN INPUT SPEECH DATA

BACKGROUND OF THE INVENTION

1. Field of the Invention

The present invention relates to a speech recognition method and to a speech recognition apparatus capable of simultaneously performing the detection of a section of input speech containing a word and recognizing a word based on a comparison with a reference pattern of the word.

2. Description of the Related Art

One known speech recognition method is the word spotting method which can simultaneously detect a section of input speech containing a word and recognize a word contained in input speech information.

The word spotting method calculates the difference between a reference pattern of a word and a parameter obtained from input speech to be recognized, while shifting the reference pattern by one frame with respect to a power time series of the input speech parameter. This difference is called the distance between the reference pattern and the section of the input speech containing a word. The word spotting method recognizes that a word corresponding to the reference pattern exists in a portion of the input speech when the distance falls below a predetermined threshold value.

However, such a conventional word spotting method cannot correctly perform recognition in the case in which a certain word includes another word as a part thereof, for example, "roku" (six) includes "ku" (nine) or "sici" (seven) includes "ici" (one).

In one example of "roku" and "ku" shown in FIG. 6, a reference pattern for "ku" is matched with two input sounds: the word "ku" and the syllable "ku" which is a part of the input word "roku", thereby resulting in incorrect detection.

SUMMARY OF THE INVENTION

It is an object of the present invention to overcome the problems of the prior art.

It is another object of the present invention to provide a speech recognition method for sequentially calculating the differences between a reference pattern and input speech while shifting the reference pattern with respect to the input speech, where the reference pattern is a combination of a word reference pattern and a silence reference pattern.

It is still further another object of the present invention to provide a speech recognition method which uses a silence pattern as part of the reference pattern, which is generated from input speech information.

It is still a further object of the present invention to provide a speech recognition apparatus and method which determines the value of speech parameters of the input speech and the reference pattern when calculating the differences therebetween.

It is a further object of the present invention to provide an apparatus and method which can simultaneously detect a word section of and recognizes a word in input speech, in which the recognition rate is improved and in which word selection is more precisely achieved.

It is another object of the present invention to provide a speech recognition apparatus and method which can distinguish a first word from a second word, where the second word includes the first word therein.

It is still another object of the present invention to provide a speech recognition apparatus and method which always creates the appropriate reference pattern despite changes in the input speech, and which can achieve more precise word spotting.

According to one aspect, the method which achieves these objectives relates to a method to be used as a part of a speech recognition method comprising the steps of storing data representing a reference pattern comprising the combination of a word reference pattern and a silence pattern, and calculating the differences between data representing the reference pattern and data representing input speech. The calculating step calculates the differences between data representing the reference pattern and data representing input speech while shifting the data representing the reference pattern with respect to the data representing the input speech. The storing step can comprise the step of storing a non-word portion of the data representing input speech as the silence pattern. In addition, the method can further comprise the step of sequentially updating the non-word portion of the data representing input speech as the silence pattern. The method further comprises the step of determining the value of speech parameters of data representing input speech and the reference pattern before the calculating step.

According to another aspect, the present invention which achieves these objectives relates to a subsystem of the speech recognition apparatus comprising input means for inputting speech data, word reference pattern storing means for storing at least one word reference pattern, reference pattern synthesizing means for synthesizing a reference pattern from a silence reference pattern and at least one word reference pattern, and calculating means for calculating the differences between the input speech data and the synthesized reference pattern.

The calculating means calculates the differences between the input speech data and the synthesized reference pattern while shifting the synthesized reference pattern with respect to the input speech data.

According to one embodiment, the system further comprises non-word portion storing means for storing a non-word portion of the input speech representing a portion of the input speech in which a word is absent. In this embodiment, the reference pattern synthesizing means synthesizes the reference pattern by using the non-word portion of the input speech as the silence reference pattern.

The apparatus can further comprise means for sequentially updating the non-word portion of the input speech data stored in the non-word portion storing means.

The calculating means can determine the values of speech parameters of the input speech data and the reference pattern.

Such a speech recognition apparatus and method are particularly advantageous when using the word spotting method for simultaneously detecting a word section and recognizing a word, since a reference pattern composed of a word reference pattern and a silence pattern is used. Moreover, since the reference pattern includes a silence pattern added thereto, the recognition rate for speech independently input by an input unit is improved and word selection is more precisely achieved. Furthermore, the use of such a silence pattern permits the apparatus to distinguish a word such as "ku" from another word including this word, such as "roku", and thus, both word patterns can be correctly recognized. In addition, by using the embodiment in which the silence pattern is recognizing from the input speech information, it is always possible to create an appropriate reference pattern despite any changes in the input speech, and it is also possible to achieve more precise word spotting. Further, because word recognition can be carried out using the silence pattern and excluding the silence pattern, speech information can be precisely recognized without being influenced by the length and characteristics of the silence pattern added to the reference pattern.

These and other objects, advantages and features of the present invention will become more apparent from the following detailed description of the preferred embodiments when taken in conjunction with the accompanying drawings.

DESCRIPTION OF THE PREFERRED EMBODIMENTS

Figure 1:
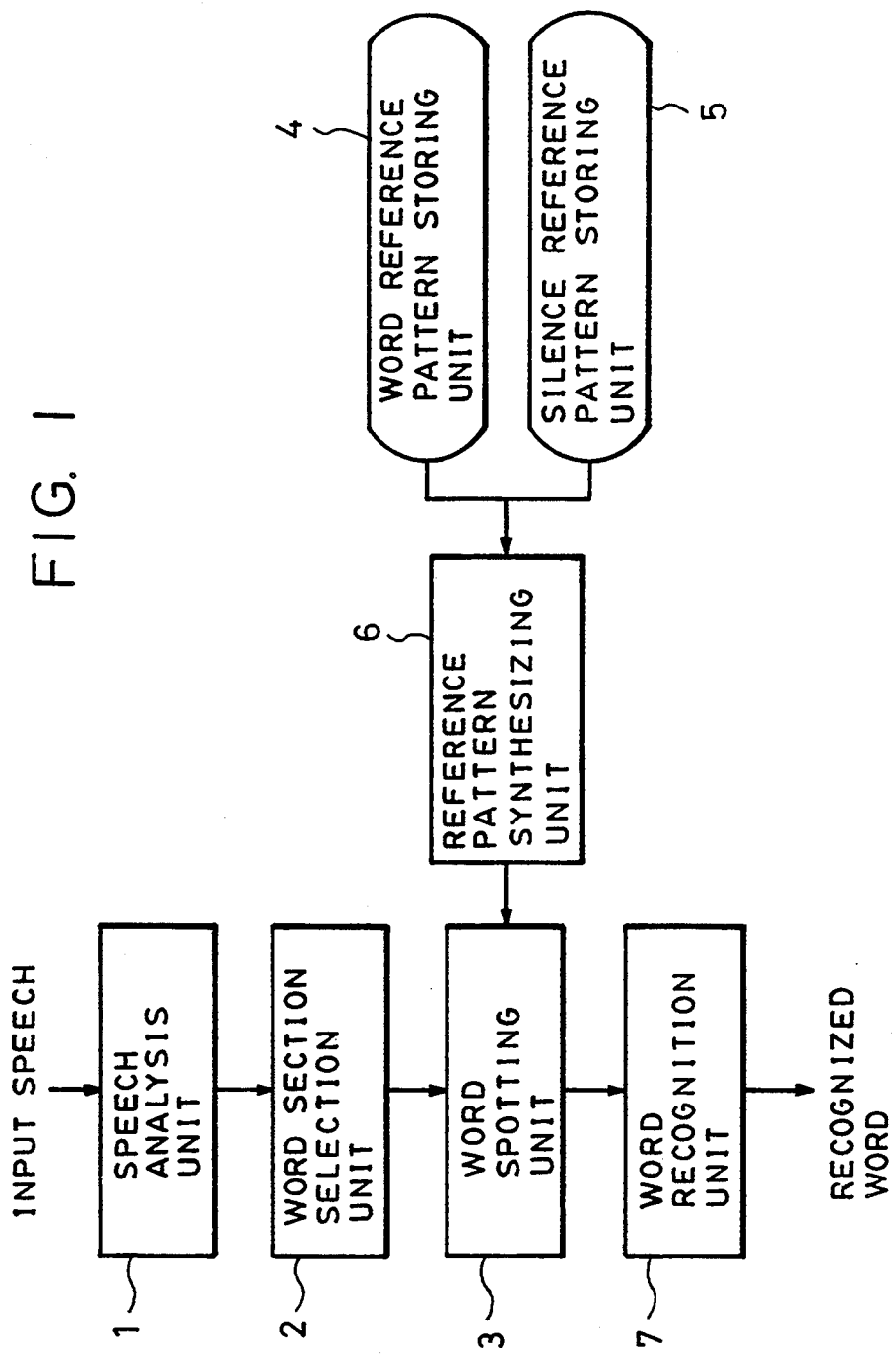
FIG. 1 is a schematic block diagram of the present invention.

FIG. 1 is a block diagram showing the construction of an embodiment of the present invention. The speech recognition apparatus of the present invention comprises a speech analysis unit 1 for analyzing input speech, a word section selection unit 2 for selecting a section including a word, a word spotting unit 3 for executing word spotting by using a registered reference pattern, a word reference pattern storing unit 4 for storing a word reference pattern expressed in a parameter time series, a silence reference pattern storing unit 5 for executing matching with a silence, a reference pattern synthesizing unit 6 for synthesizing a word reference pattern stored in the word reference pattern storing unit 4 and a silence reference pattern stored in the silence reference pattern storing unit 5, and a word recognition unit 7 recognizing a word from the input speech.

Figure 2:
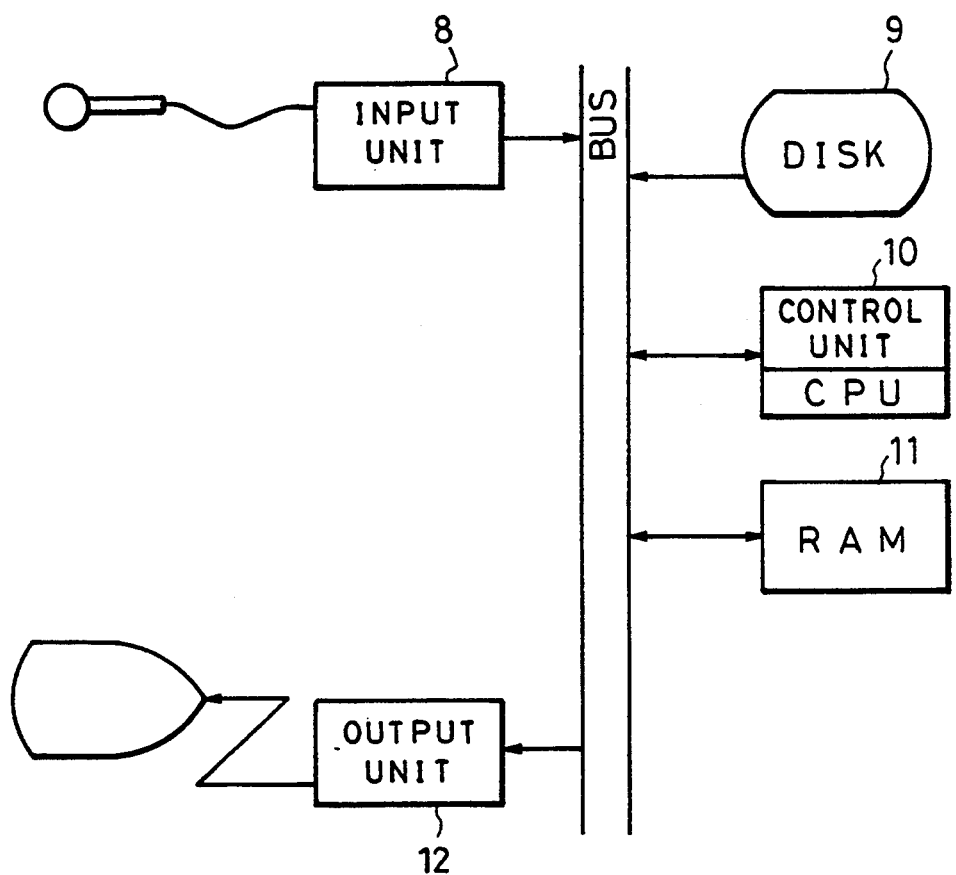
FIG. 2 is a schematic block diagram of a speech recognition apparatus of the present invention.

FIG. 2 is a constructional block diagram of a specific speech recognition apparatus to realize a recognition method of the present invention. Referring to FIG. 2, the speech recognition apparatus comprises an input unit 8 for inputting speech to be recognized, a disk 9, such as a hard disk or a floppy disk, for storing various kinds of data, and a control unit 10 for controlling the speech recognition apparatus including a read-only memory (ROM) for storing a control program shown in FIG. 3. The control unit 10 determines the processes to be performed and performs a control operation according to the control program in the ROM. Reference numerals 11 and 12 denote a random access memory (RAM) for storing various kinds of data from the units shown in FIG. 1, and an output unit composed of, for example, a CRT display or a printer, respectively. The units shown in FIG. 1 each may have a CPU, a RAM and a ROM.

Process operations of the present invention will now be explained with reference to FIG. 3. Speech input from the input unit 8 is analyzed into parameters suitable for speech recognition, such as LPC cepstrums by the speech analysis unit 1, and power time series of the input speech are simultaneously found (Step S1). The power time series found by the speech analysis unit 1 are monitored by the word section selection unit 2, a point where the power of the speech exceeds a predetermined threshold value is recognized as a portion where a word is likely to exist, and a section long enough to contain a word including the point is selected as a word section from the time series (Step S2). However, the word section selection is not performed so strictly. Word spotting is conducted by the word spotting unit 3 on the parameter series found by the word section selection unit 2 by using a reference pattern obtained by synthesizing silence patterns in the silence reference pattern storing unit 5 before and after a word reference pattern stored in the word reference pattern storing unit 4 by the reference pattern synthesizing unit 6. The frame length of the silence reference pattern added to the word reference pattern in the reference pattern synthesizing unit 6 should be sufficiently long to take into account silent sections of speech arising from a geminated consonant and a silent plosive consonant before and after the silence reference pattern. For example, if a dynamic programing method (DP) with inclination control of $\frac{1}{2} \sim 2$ is used in matching input speech to stored speech patterns, frames which number more than twice the number of silent sections to be added by a geminated consonant and a silent plosive consonant are added to a word reference pattern. It is thereby possible to prevent incorrect detection of a word even if silent sections are made by a geminated consonant and a silent plosive consonant before and after the silence reference pattern. The detailed operation of the word spotting unit 3 will be described with reference to the flow chart shown in FIG. 3. First, a distance calculation using a word spotting operation conducted by the word spotting unit 3 is made for each frame of input speech in Step S3. A dynamic programming (DP) value, D(i), or distance can be obtained for each frame from the expressions listed below, in the case where the DP method is used as follows:

a) Cumulative Distance $$P(i,j) = \min \begin{cases} P(i-1, j-1) + 2d(i-1, j) + d(i,j) & \text{(a)} \\ P(i-1, j-1) + 2d(i,j) & \text{(b)} \\ P(i-1, j-1) + 2d(i, j-1) + d(i,j) & \text{(c)} \end{cases} \quad (1)$$

b) Optimal Path Length $$C(i,j) = \begin{matrix} C(i-2, j-1) + 3 & \text{if(a)} \\ C(i-1, j-1) + 2 & \text{if(b)} \\ C(i-1, j-2) + 3 & \text{if(c)} \end{matrix} \quad (2)$$

c) DP Value $$D(i) = P(i,J)/C(i,J) \quad (3)$$

i: i-th frame of input parameter
j: j-th frame of reference pattern
d(i,j): distance between input vector of i-th frame and reference pattern of j-th frame
P(i,j): cumulative distance at point (i,j)
C(i,j): optimal path length at point (i,j)
J: length of reference pattern The DP value, D(i), is the distance between each frame of a word section of input speech and a reference pattern synthesized from unit 6.

A brief description will now be given of the spotting operation performed in Step S3, with reference to the formulae (1) to (3).

A DP matching operation is executed between the word section of input speech and the standard patterns stored in the dictionary, while shifting the reference patterns in a frame-by-frame fashion with respect to the input speech. The distance between the i-th frame of the input speech and the j-th frame of the reference pattern is expressed by d(i.j) in formula (1), and the cumulative distance between these frames is represented by P(i.j) in the same formula.

The formula (2) shown above is intended for calculating the optimal path length for each frame of the input speech and the reference pattern.

The DP value (D(i)) appearing in the formula 3 is a value which is obtained, when the standard pattern length is represented by J, by dividing P(i,J) by C(i,J) so as to normalize any fluctuation caused by length variation.

By monitoring the DP value while shifting the reference pattern with respect to the input speech in a frame-by-frame fashion, it is possible to detect the moment at which the DP value is a minimum. Detecting the word and recognition of this word can simultaneously be performed on the basis of the position at which the minimum of the DP value is detected and the reference pattern with which the minimum of DP value is obtained.

Figure 5:
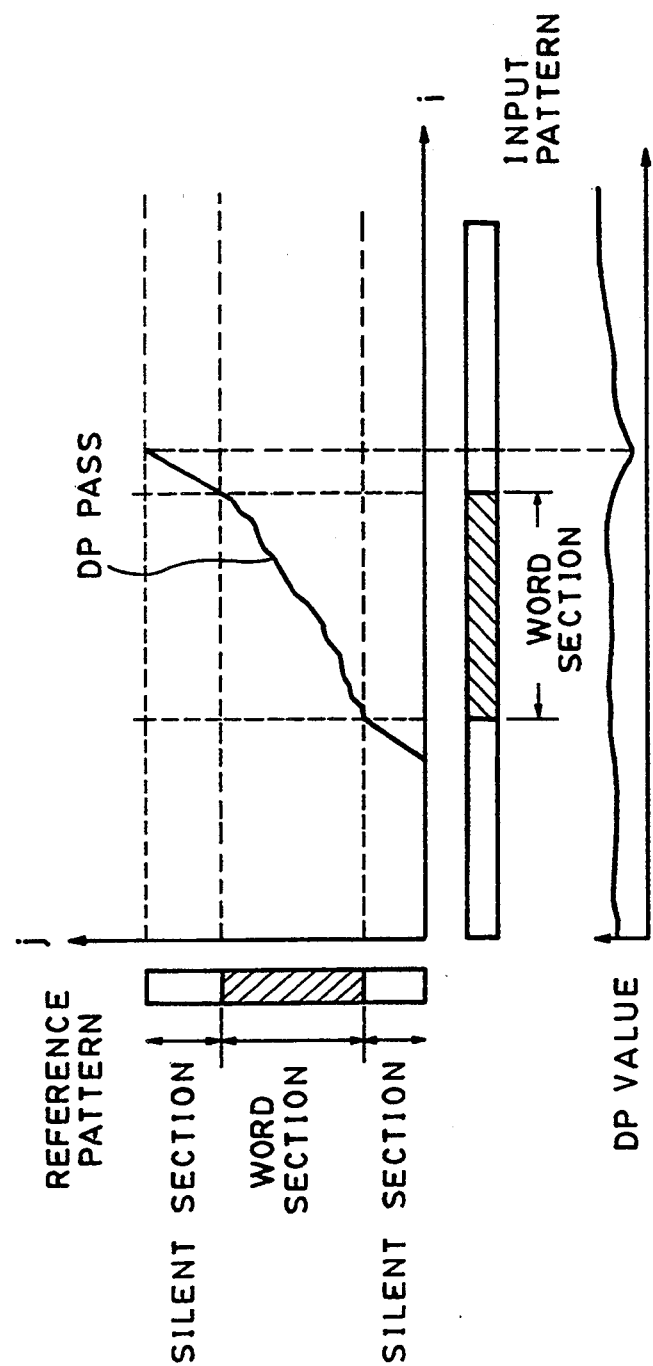
FIG. 5 is a view explaining a distance recalculation operation.

FIG. 5 shows, by way of example, the manner in which data is obtained during matching with a certain reference pattern.

Figure 4:
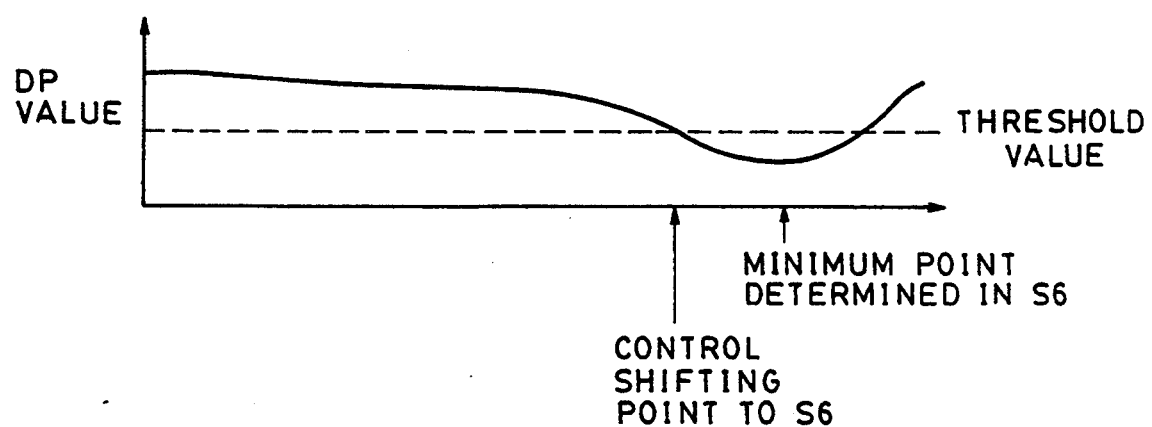
FIG. 4 is a view explaining detection of the minimum point.
Figure 6:
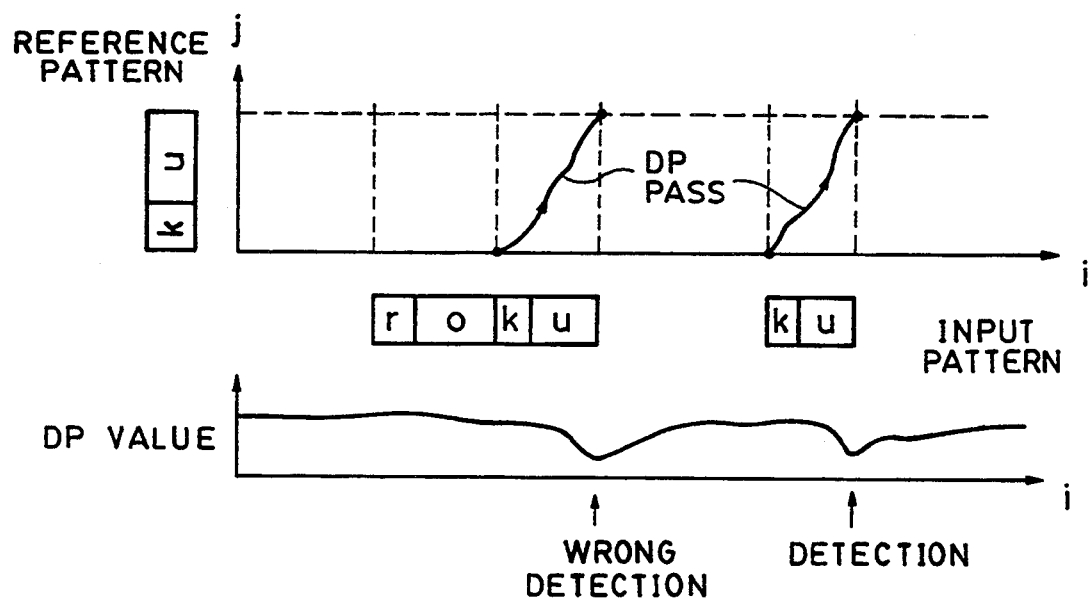
FIG. 6 is a view explaining incorrect recognition in the connected DP.

In Step S4, a DP value D(i) shown in the expression (3) is compared with a preset threshold value. If D(i) is less than the threshold value, Step S6 is executed, and Step S5 is executed if D(i) is greater than or equal to the threshold value. In Step S5, the word spotting unit checks whether or not the calculation in Step S3 is performed for all frames of a selected section. If the calculation for all frames of a selected section is completed, Step S8A is executed, and if the calculation is not completed, the distances of the remaining frames are calculated by returning to Step S3. In Step S6, as shown in FIG. 4, the word spotting unit 3 determines the point at which the DP value in a section which is less than the threshold value is a minimum. The term "DP pass," as used in FIGS. 5 and 6 is used to mean a route or path traced back along points where C(i,j) is minimized from a terminal end of the reference pattern at which the DP value as determined by the formula (3) takes a minimum value. In Step S7, as shown in FIG. 5, back tracking of DP pass is performed from the point of the minimum value found in Step S6, the distance of only a word section indicated by a thick line of DP pass shown in FIG. 5 is calculated again, and the found distance is temporarily stored in a buffer as the distance of an input word. In Step S8B, the word spotting unit 3 checks whether matching of the selected word section with reference patterns of all registered words is completed. If the matching is completed, Step S10 is executed, and if the matching is not completed, calculation of the distance between the selected word section and another reference pattern representing the next registered word, the pattern for which is stored in unit 4 is started by returning to Step S3. After the above word spotting is performed in the word spotting unit 3 shown in FIG. 1, the distances between the selected word section of input speech and the reference patterns obtained by conducting word spotting on the patterns synthesized by the reference pattern synthesizing unit 6 are compared in the word recognition unit 7, and the word associated with the minimum distance is output as a recognized word (Step S10). If D(i) is greater than the threshold value in Step S4 for every word in storage unit 4 which is matched with the selected word section of input speech, it is determined by word recognition unit 7 that there is no recognized word for the selected word section (Step S9).

Although a word section is roughly selected based on the power time series of input speech and then word spotting is conducted on the selected word section in this embodiment, if the distance is calculated while always shifting the reference pattern which is compared to an input pattern in the form of a selected word section by word spotting, the apparatus checks whether the distance between the reference patterns and the inputted selected word section falls below the threshold value and a recognition operation is executed when the distance falls below the threshold value, recognition can be achieved without selecting a word section beforehand.

Although word recognition is carried out by adding the silence reference patterns before and after the word reference pattern in this embodiment, the silent reference patterns may be added before or after the word reference pattern as necessity requires.

Another embodiment of the present invention will now be described.

In this embodiment, a silence reference pattern to be added is not a prepared reference pattern, but a reference pattern found by calculation based on each silence portion in an input signal occurring before a selected word section. It is possible, by the use of this embodiment, to perform word spotting which is unlikely to be influenced by background noise.

It is a well-known fact that the strength and kind of the background noise have a great influence on the recognition rate of speech. This also applies to the recognition of a word section. Therefore, if word spotting is carried out by using a silence reference pattern calculated from silence information in a quiet portion of an input speech signal, it is possible that the word spotting will not be properly performed with respect to input speech including much background noise. Accordingly, proper word spotting is achieved by using a silent section in an input speech signal occurring before a selected word section.

Figure 7:
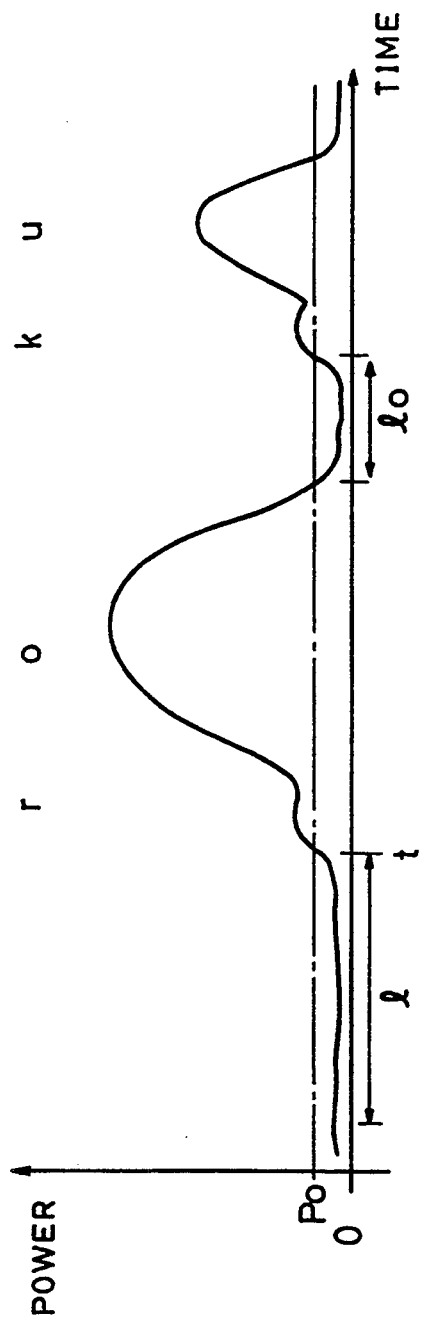
FIG. 7 is a schematic view explaining detection of a start point of a word section.

FIG. 7 schematically shows the speech power of the input speech "roku". $P_0$ designates a threshold value used to select a word section of the input speech. Referring to FIG. 7, the apparatus recognizes that a word section starts at a time t when the speech power exceeds the threshold value $P_0$, and the control unit 10 calculates a silence reference pattern with respect to a silent section of the input speech that occurs before the word section. The silence reference pattern has a duration l. At this time, if l is set to approximately twice the continuous length of a geminated consonant, it is possible to cope with a silent section $l_0$ before the silent plosive consonant "k" shown in FIG. 7.

Figure 3:
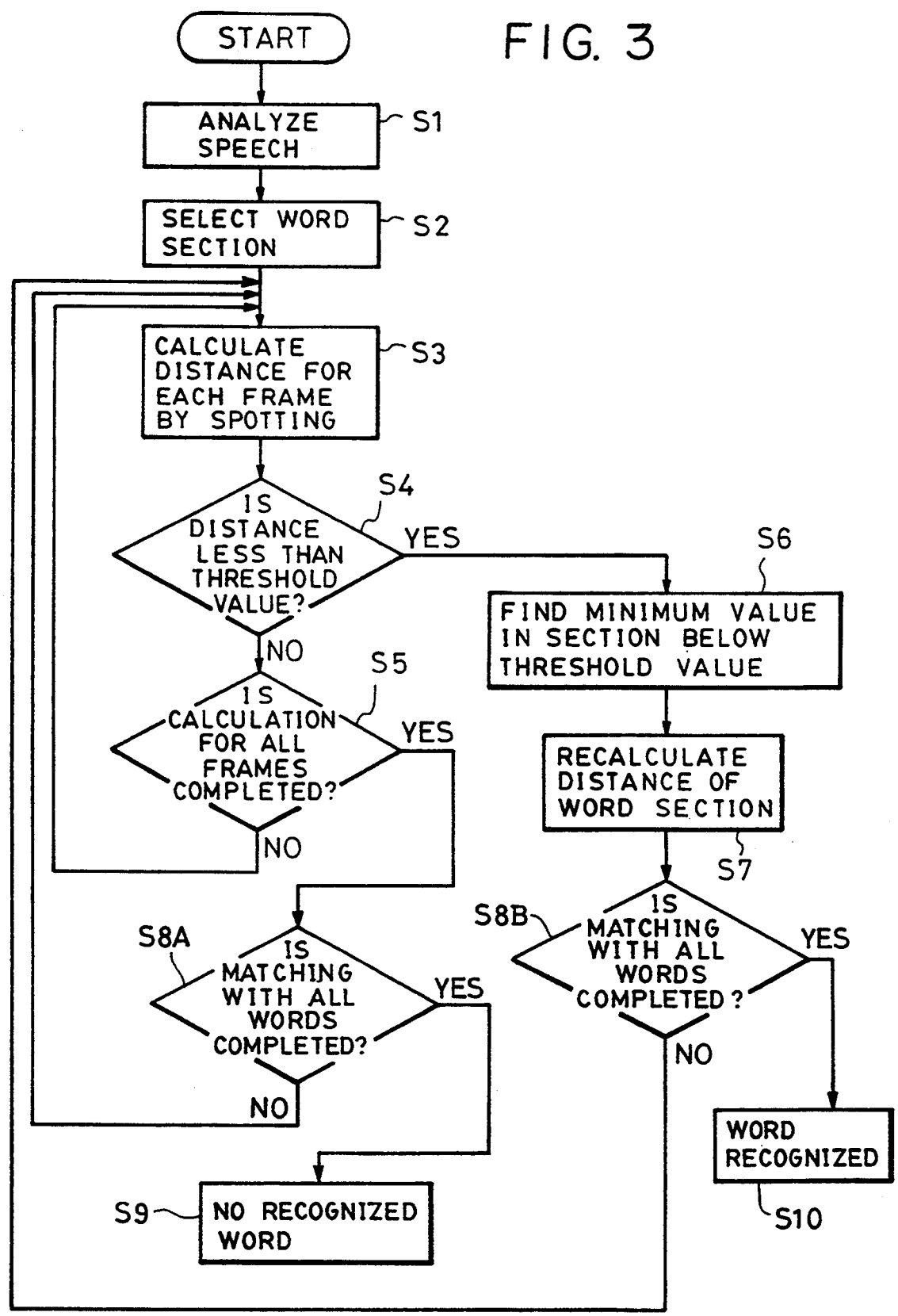
FIG. 3 is a control flow chart of the present invention.
Figure 8:
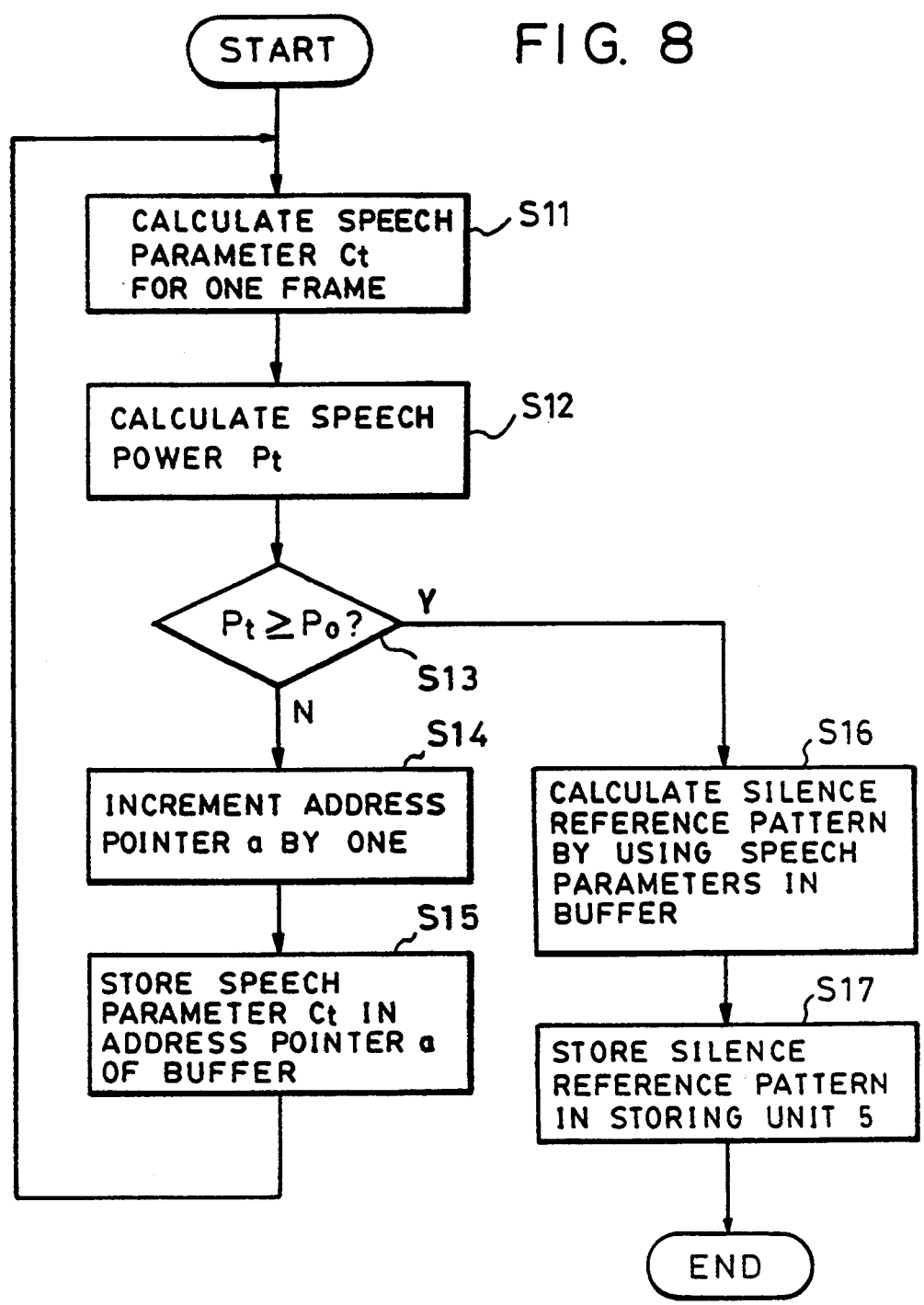
FIG. 8 is a control flow chart of speech analysis according to the present invention.

FIG. 8 is a detailed flow chart of the speech analysis operation in Step S1 of FIG. 3 according to this embodiment. Analyzed parameters are stored in a buffer in the RAM 11 shown in FIG. 2.

With reference to FIG. 8, the speech analysis will now be described in detail.

Figure 9:
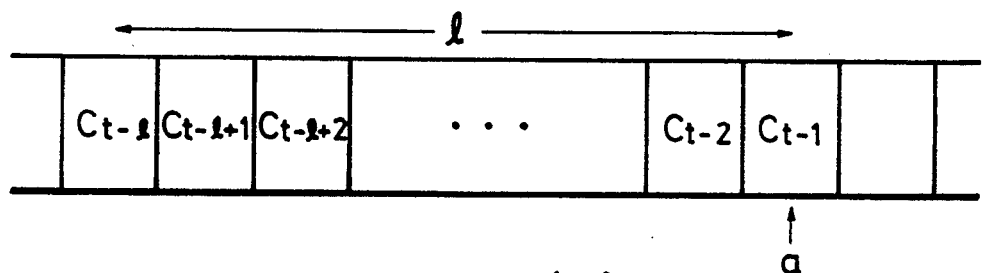
FIGS. 9(1) and 9(2) are explanatory views of buffers for storing speech parameters.
Figure 9:
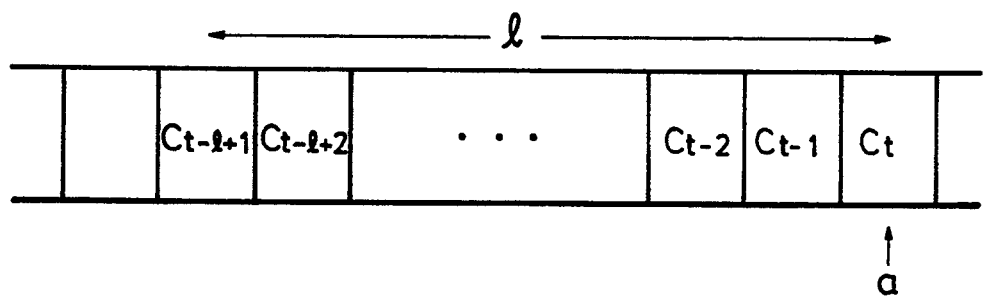

First, a speech parameter $C_t$ related to input speech for one frame is calculated in Step S11. Then, a speech power $P_t$ for one frame is calculated (Step S12), and compared with a preset threshold value $P_0$ (Step S13). If the speech power $P_t$ is less than the threshold value $P_0$, the speech analysis unit 1 determines that a silent section of the input speech continues, and an address pointer a for a buffer is incremented by one (Step S14). Then, the calculated speech parameter $C_t$ is stored at an address designated by the address pointer a in the buffer in Step S15. FIG. 9(1) shows the state of the buffer in Step S12 at the time t. A speech parameter $C_{t-1}$ for one frame calculated at a time $t-1$ is stored at an address designated by the address pointer a. Before the speech parameter $C_{t-1}$, speech parameters $C_{t-2}, C_{t-3}, \ldots, C_{t-U}$ corresponding to times t-2, t-3, ..., $t-1$ are stored. If it is determined in Step S13 that the speech power $P_t$ is less than the threshold value $P_0$ at the time t, since Steps 14 and 15 are executed, the state of the buffer becomes as shown in FIG. 9(2). The address to which the address pointer a points is advanced by one, and the speech parameter $C_t$ at the time t is stored at the advanced address. The Steps S11 to S15 are repeated until the speech power $P_t$ exceeds or is equal to the threshold value $P_0$.

If the speech power $P_t$ has a value equal to or greater than the threshold value $P_0$ in Step S13, the speech analysis unit 1 determines that a word section starts at a point when the speech power $P_t$ exceeds or is equal to the threshold value $P_0$, and Step S16 is executed.

In Step S16, a silence reference pattern is calculated by using speech parameters stored in the buffer. Although speech parameters corresponding to a silent section occurring before a word section in an input signal are stored in the buffer, since background noise is also included in the input signal in the buffer, precise word spotting can be achieved regardless of the strength and kind of the background noise by using a silence reference pattern calculated from the speech parameters.

The number of speech parameters in the buffer used to calculate the silence reference pattern depends on how the reference pattern synthesizing unit 6 shown in FIG. 1 adds the silence reference pattern to the word reference pattern. The addition is roughly performed by the following two methods.

a) Silence reference patterns for l frames are stored in the silence reference pattern storing unit 5, and added to the word reference pattern.

b) Silence reference patterns for several frames are stored in the silence reference pattern storing unit 5, and repeatedly used so as to be added to the word reference pattern as a silence reference pattern for the l frames.

In method a), silence reference patterns for l frames are created by using l speech parameters from $C_{t-U+1}$ to $C_t$ in the buffer. In method b), several typical speech parameters are selected from the buffer so as to create silence reference patterns for several frames.

The thus created silence reference patterns are stored in the silence reference pattern storing unit 5, and speech analysis is completed (Step S17).

Figure 10:
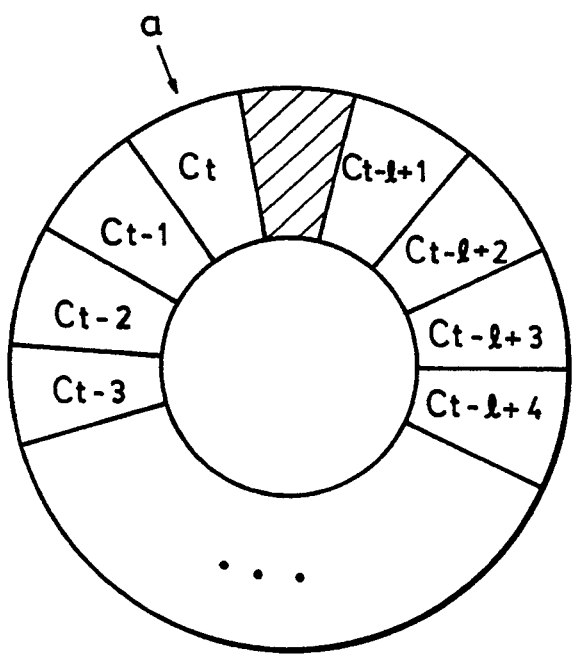
FIG. 10 is an explanatory view of a ring buffer.

Although FIGS. 9(1) and 9(2) schematically show that the buffer can have an infinite length, if a ring buffer shown in FIG. 10 is used, the length of the buffer may be at most $l+1$.

The individual components represented by the blocks shown in FIG. 2 are well known in the voice recognition art and their specific construction and operation is not critical to the invention or the best mode for carrying out the invention. Moreover, the steps discussed in the specification and shown in FIGS. 3 and 8 can be easily programmed into well known central processing units by persons of ordinary skill in the art and since such programming per se is not part of the invention, no further description thereof is deemed necessary.

What is claimed is:

1. A method of detecting words in input speech data, comprising the steps of:

storing data representing a reference pattern which comprises a combination of (i) a word reference pattern and (ii) silence reference patterns which are each sufficiently long to take into account silent sections of speech arising from a geminated consonant or a silent plosive consonant;

calculating distances between data representing the reference pattern and data representing input speech; and detecting words in the data representing input speech based on the calculated distances between the data representing the reference pattern and the data representing input speech.

2. The method as recited in claim 1, wherein said calculating step calculates distances between data representing the reference pattern and data representing input speech while shifting the data representing the reference pattern with respect to the data representing the input speech.

3. The method as recited in claim 2, wherein said storing step comprises the step of storing a non-word portion of the data representing input speech as the silence reference pattern.

4. The method as recited in claim 3, further comprising the step of sequentially updating the non-word portion of the data representing input speech as the silence reference pattern.

5. The method as recited in claim 2, further comprising the step of determining the value of speech parameters of data representing input speech and the reference pattern before said calculating step.

6. An apparatus for detecting words in input speech data, comprising:

input means for inputting speech data;

word reference pattern storing means for storing word reference pattern data;

reference pattern synthesizing means for synthesizing reference pattern data from silence reference pattern data which is sufficiently long to take into account silent sections of speech arising from a geminated consonant or a silent plosive consonant;

calculating means for calculating distances between the input speech data and the synthesized reference pattern data; and detecting means for detecting words in the input speech data based on the calculated distances between the synthesized reference pattern data and the input speech data.

7. The apparatus as recited in claim 6, wherein said calculating means calculates the distances between the input speech data and the synthesized reference pattern data while shifting the synthesized reference pattern data with respect to the input speech data.

8. The apparatus as recited in claim 7, further comprising a non-word portion storing means for storing a non-word portion of the input speech data representing a portion of the input speech in which a word is absent, wherein said reference pattern synthesizing means synthesizes the reference pattern data by using the non-word portion of the input speech data as the silence reference pattern data.

9. The apparatus as recited in claim 8, further comprising means for sequentially updating the non-word portion of the input speech data stored in said non-word portion storing means.

10. The apparatus as recited in claim 6, wherein said calculating means determines values of speech parameters of the input speech data and the synthesized reference pattern data.

11. The apparatus as recited in claim 6, wherein said word reference pattern storing means is a read only memory.

12. The apparatus as recited in claim 6, wherein said word reference pattern storing means is a random access memory.

13. A method of detecting words in input speech data, comprising the steps of:

inputting speech data;

synthesizing reference pattern data from stored word reference pattern data and stored silence reference pattern data which is at least twice the size of silence reference pattern data representing a germinated consonant;

shifting the reference pattern data frame by frame with respect to the input speech data;

calculating distances between the input speech data and the reference pattern data for each frame of data; and detecting words in the input speech data based on the calculated distances between the input speech data and the reference pattern data.

14. A method according to claim 13, wherein the silence reference pattern data is determined by calculations performed on selected portions of the input speech data.

15. An apparatus for detecting words in input speech data, comprising:

input means for inputting speech data;

word reference storing means for storing word reference pattern data;

silence reference storing means for storing silence reference pattern data which is at least twice the size of silence reference pattern data representing a geminated consonant;

synthesizing means for synthesizing reference pattern data from the word reference pattern data and the silence reference pattern data;

shifting means for shifting the reference pattern data frame by frame with respect to the input speech data;

calculating means for calculating distances between the input speech data and the reference pattern data for each frame of data; and detecting means for detecting words in the input speech data based on the calculated distances between the input speech data and the reference pattern data.

16. An apparatus according to claim 15, further comprising silence reference pattern calculating means for performing calculations on selected portions of the input speech data to determine the silence reference pattern data.

17. The apparatus as recited in claim 13, wherein said word reference storing means is a read only memory.

18. The apparatus as recited in claim 13, wherein said word reference storing means is a random access memory.

19. The apparatus as recited in claim 13, wherein said silence reference storing means is a read only memory.

20. The apparatus as recited in claim 13, wherein said silence reference storing means is a random access memory.

* * * * *

UNITED STATES PATENT AND TRADEMARK OFFICE
CERTIFICATE OF CORRECTION

PATENT NO. : 5,369,728
DATED : November 29, 1994
INVENTOR(S) : TETSUO KOSAKA, et al.

It is certified that error appears in the above-indentified patent and that said Letters Patent is hereby corrected as shown below:

COLUMN 4

Line 62, "P(i-1, j-1) + 2d (i-1, j) + d (i, j)"
    should read --P(i-2, j-1) + 2d (i-1, j) + d (i, j)--.
Line 66, "P(i-1, j-1) + 2d (i, j-1) + d (i, j)"
    should read --P(i-1, j-2) + 2d (i, j-1) + d (i, j)--.

Signed and Sealed this

Eleventh Day of April, 1995

Attest:

BRUCE LEHMAN

*Attesting Officer*　　*Commissioner of Patents and Trademarks*